(12) United States Patent
Jay et al.

(10) Patent No.: US 6,901,463 B2
(45) Date of Patent: May 31, 2005

(54) METHOD AND DEVICE FOR LINKING WORK REQUESTS WITH COMPLETION QUEUE ENTRIES

(75) Inventors: Stephen A. Jay, Chelmsford, MA (US); Mark R. Johnson, Merrimack, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 209 days.

(21) Appl. No.: 10/382,163

(22) Filed: Mar. 5, 2003

(65) Prior Publication Data

US 2004/0250000 A1 Dec. 9, 2004

(51) Int. Cl.[7] .............................................. G06F 13/00
(52) U.S. Cl. ......................... 710/52; 710/24; 710/310; 709/106; 370/412
(58) Field of Search .................. 370/412; 709/104–108, 709/212; 710/6–7, 1, 24–29, 308–310

(56) References Cited

U.S. PATENT DOCUMENTS

| | | | | |
|---|---|---|---|---|
| 5,671,365 A | * | 9/1997 | Binford et al. ............. | 710/100 |
| 6,157,962 A | * | 12/2000 | Hodges et al. ................. | 710/1 |
| 6,477,587 B1 | * | 11/2002 | Isoda et al. ..................... | 710/6 |
| 6,530,042 B1 | * | 3/2003 | Davidson et al. ............. | 714/47 |
| 6,691,217 B2 | * | 2/2004 | Beukema et al. ........... | 711/170 |
| 6,718,370 B1 | * | 4/2004 | Coffman et al. ............ | 709/212 |
| 6,721,806 B2 | * | 4/2004 | Boyd et al. ................. | 719/312 |

OTHER PUBLICATIONS

"InfiniBand Architecture Specification vol. 1 –Release 1.1" Nov. 6, 2002, InfiniBand Trade Association XP001191014 • p. 75, line 7 –line 22 • p. 80, line 33 –p. 82, line 30 • p. 464, line 40 –line 42 • p. 555, line 18 –line 21.

\* cited by examiner

*Primary Examiner*—Christopher B. Shin

(57) ABSTRACT

A method for linking work requests in a work queue with entries on a queue of completed requests. For each work queue, a tracking list is created. Each tracking list is linked to one queue of completed requests. When a work request is added to a given work queue, an entry is added to the associated tracking list. The entry in the tracking list contains all of the information needed to uniquely associate a completion queue entry to the work request that caused the completion queue entry. When a completion queue entry is retrieved from the completion queue, the tracking list for the work queue is searched for an entry corresponding to the completion queue entry. The work request that caused the completion queue entry is then identified from the information in the tracking list entry.

14 Claims, 4 Drawing Sheets

METHOD AND DEVICE FOR LINKING WORK REQUESTS WITH COMPLETION QUEUE ENTRIES

TECHNICAL FIELD

The present invention relates to control of queues of instructions for execution by network communication processors, and, in particular, to post-execution processing of operation completion.

BACKGROUND OF THE INVENTION

In communication networks, it is often advantageous for a client process to form queues of instructions that cause data messages to be exchanged with other processors or "nodes." These lists of instructions may then be executed by hardware resources, a synchronously. The hardware may subsequently notify the client of completion of the operation. Problems may arise when instruction queues are destroyed before the client process has completed processing the operation completion notifications.

One such communication network is implemented according to the Infiniband™ Architecture Specification developed by the Infiniband$^{SM}$ Trade Association, the specification for which is incorporated herein by reference (Infiniband™ Architecture Specification, version 1.1). The Infiniband™ Architecture defines a system area network for connecting multiple independent processor platforms (i.e., host processor nodes), input/output ("IO") platforms, and IO devices as is shown in FIG. 1. The system 100 is a communications and management infrastructure supporting both IO and interprocessor communications for one or more computer systems. The system 100 can range from a small server with one processor and a few IO devices to a massively parallel supercomputer installation with hundreds of processors and thousands of IO devices. Communication among nodes is accomplished according to an Infiniband™ protocol. In addition, the IP (Internet protocol) friendly nature of the architecture allows bridging to an Internet, intranet, or connection to remote computer systems 111.

The Infiniband™ architecture defines a switched communications fabric 101 allowing many devices to concurrently communicate with high bandwidth and low latency in a protected, remotely managed environment. The system 100 consists of processor nodes 102, 103, and 104 and 10 units 105, 106, 107, and 108 connected through the fabric 101. The fabric is made up of cascaded switches 109 and routers 110. IO units can range in complexity from a single attached device, such as a SCSI or LAN adapter to large memory rich RAID subsystems 107.

The foundation of Infiniband™ operation is the ability of a client process to queue up a set of instructions that hardware devices or nodes, such as a host channel adapter 112 ("HCA"), switch 109, or router 110 execute. This facility is referred to as a work queue. Work queues are always created in pairs consisting of a send work queue and a receive work queue. The send work queue holds instructions that cause data to be transferred between the client's memory and another process's memory. The receive work queue holds instructions about where to place data that is received from another process. Each node may provide a plurality of queue pairs, each of which provides independent virtual communication ports.

In the HCA queuing model: the client submits a work request, which causes an instruction called a work queue element ("WQE") to be placed on the appropriate work queue. The channel adapter executes WQEs on a particular work queue in the order that the WQEs were placed on the particular work queue. When the channel adapter completes a WQE, a completion queue element ("CQE") may be placed on a completion queue. A client may access the completion queue to determine if a work request has been completed. Each CQE specifies all the information necessary for a work completion, and either contains that information directly or points to other structures, such as the associated WQE, that contain the information. Further, one completion queue may receive CQEs associated with a plurality of work queues.

If a CQE points to an associated WQE for needed completion information, a problem may arise when a work queue is destroyed or reset. Since client processes submit work requests and retrieve completion information from a completion queue a synchronously, a work queue may be destroyed or reset before all of the completed CQEs have been processed. If a client process needs a WQE in a destroyed work queue for completion information to process a CQE, it may not be possible to perform orderly completion processing. This can lead to problems such as resource leakage.

SUMMARY OF THE INVENTION

In an embodiment of the invention, a method is provided for linking entries in a completion queue, which comprises operation completion notifications, with the work requests that initiated these network operations. These work requests are added to work queues by client processes to request a network operation. For each work queue, a tracking list is created. Each work queue and tracking list is associated with one completion queue. When a work request is posted to a given work queue, an entry is added to the associated tracking list. The entry in the tracking list contains all of the information needed to uniquely link a completion queue entry to a work request, providing the information needed for a client process to perform post-execution processing for the work request, i.e., a work request identifier and a resource identifier. Such post-execution processing may include freeing resources such as memory buffers used for the work request. When a client process retrieves a completion queue entry, the client can search the tracking list associated with the work queue for the resource identifier contained in the completion queue entry. The client can then retrieve the work request identifier from the tracking list entry. The work request identifier provides the information the client needs to perform post-execution processing for the work request. This method advantageously allows a client to perform needed processing on completed work requests, when the corresponding work queue is unavailable, because the work queue has been destroyed, or otherwise.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In communication networks, it is often advantageous for a client process running on a host computer to form queues of instructions, called "work requests," that initiate operations such as data exchanges with other network nodes. These work requests contain the information needed to perform the desired network operation, either directly or indirectly. These lists of instructions, which will be called a "work queue" in this description and in any appended claims, may then be executed by other processing resources (e.g., hardware resources such as host channel adapters.) These processing resources may subsequently notify the client of completion of the operation requested by the work request. This notification may include adding a completion notification entry to a queue of such entries, which will be called hereinafter, a "completion queue." Thus, a client uses these work queues and completion queues to communicate with the processing entity that performs the network operations. Problems may arise when a work queue is destroyed or otherwise become unavailable, before the client has completed processing the completion notification entries for the work requests from that work queue.

Figure 1:
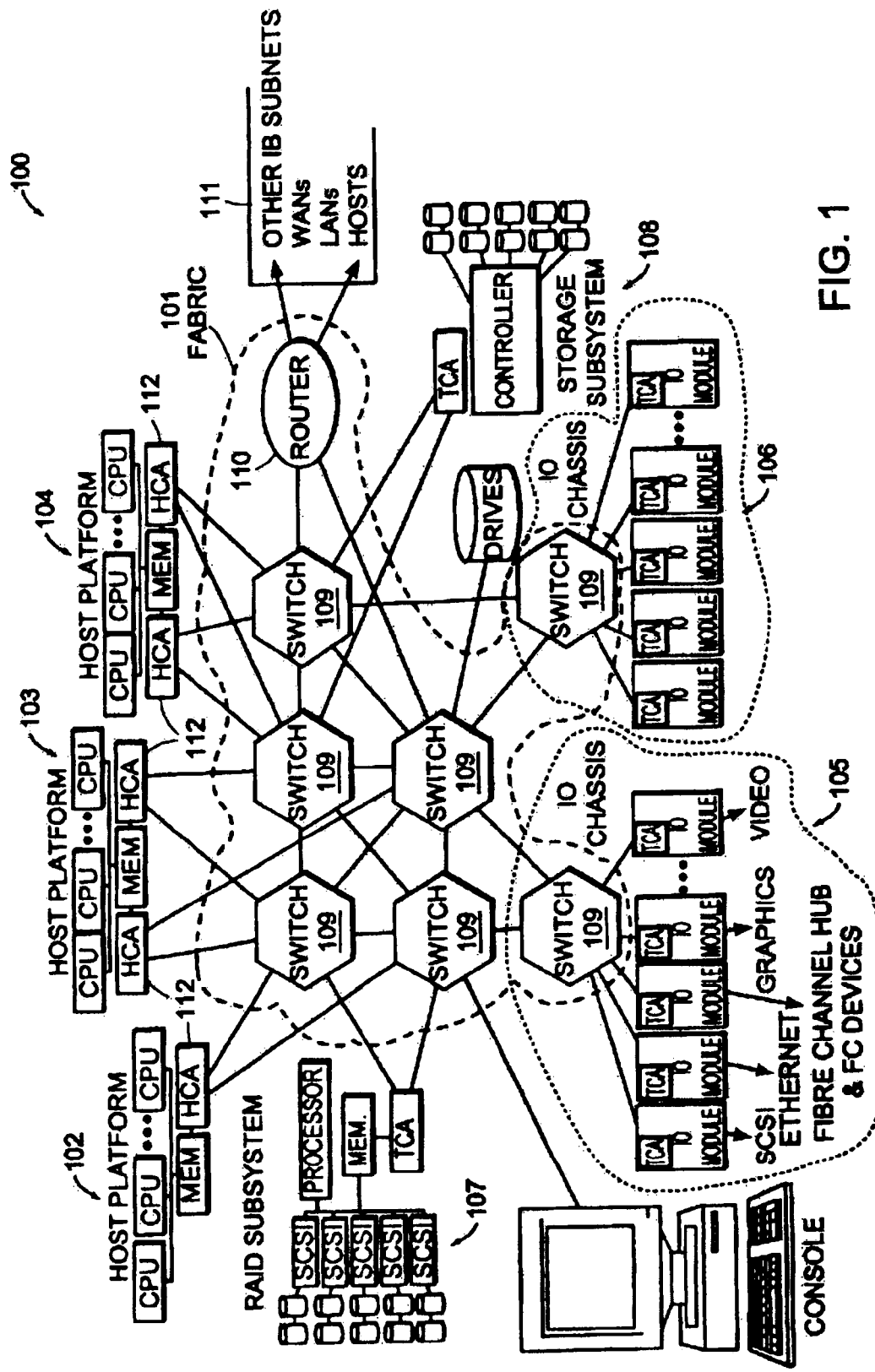
FIG. 1 shows a block diagram of a network of computer nodes according to the InfiniBand™ specification.
Figure 2:
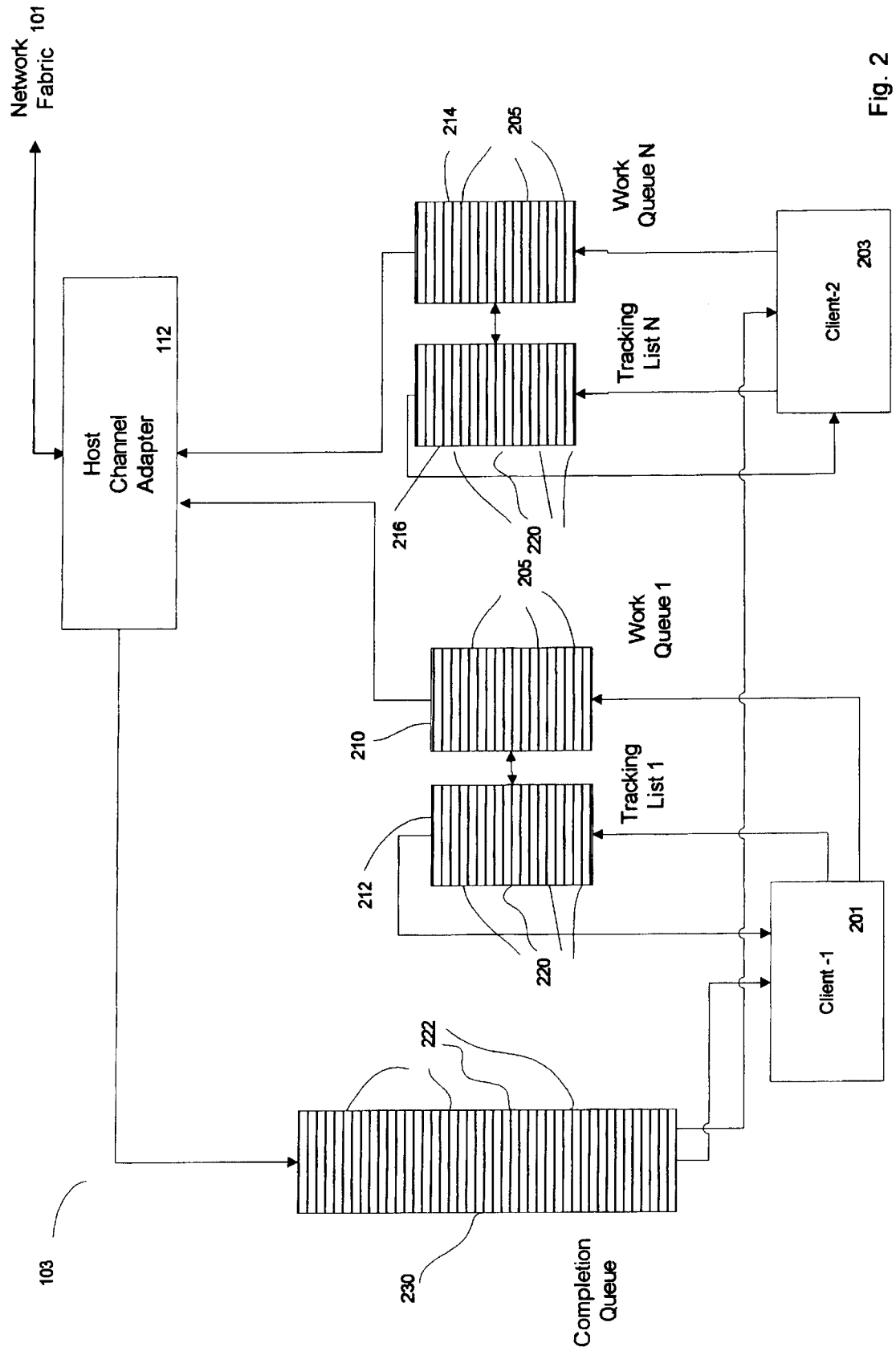
FIG. 2 shows a block diagram of structures used for linking a completion queue with a work request queue according to an embodiment of the present invention.

FIG. 2 is a block diagram for logic structures that can be used advantageously in an embodiment of the invention to address problems in processing completion queue entries for work requests from work queues that are unavailable, either because the work queue was destroyed, or otherwise. For purposes of illustration, these structures are described for host platform 103 in FIG. 1. Likewise, the processing resource that sends and receives information to/from network fabric 101 will be called a host channel adapter ("HCA") 112.

Client-1 201 and client-2 203 load work requests 205 for network operations onto work queues, 210 and 214. While each client is shown linked to one work queue, the number of clients and work queues is not limited and each client may load a work request onto any work queue. Completion queue 220 is loaded by HCA 112 with completion notification entries 222, when a network operation initiated by a work request completes. Each client can read these entries 222. Since each completion queue entry may correspond to a work request in one of a plurality of work queues, each completion queue entry contains a work queue identifier that identifies the work queue that initiated the operation. The work queues 210, 214 and completion queue 230 thus form a communication mechanism between clients and HCA so that clients and HCA may operate independently from each other in requesting and executing network operations.

A tracking list 212, 216, is provided for each work queue to link the work queue with the completion queue that receives completion notifications for that work queue. When a client adds a work request 205 to a work queue, an entry 220 is added to the tracking list for that work queue. The tracking list entry contains an identifier for the work request, which will be called hereinafter a "work request identifier" and an indicator called a "resource identifier." This resource identifier may be a pointer to the WQE or a work queue index for the request or any other indicator that uniquely identifies the work request. The completion queue entry, if an entry is created for the work request, will contain the resource identifier for the work request. Note that this resource identifier may be used to identify the work request in preference to using the work request identifier for this purpose, for example, if the work request identifier requires more storage than the resource identifier. Thus, even if the work queue has been destroyed or is otherwise unavailable, the client can use the work queue identifier in the completion queue entry to identify the tracking list that corresponds to the completion queue entry. The resource identifier in the completion queue entry can then be used as a search key to locate the tracking list entry corresponding to the completion queue entry. From the work request identifier in the tracking list entry, the client can retrieve information about the work request and perform post-operation-execution processing such as freeing resources for the request (e.g., memory buffers) or performing error related processing if the completion queue entry reported that the operation completed with an error.

Figure 3:
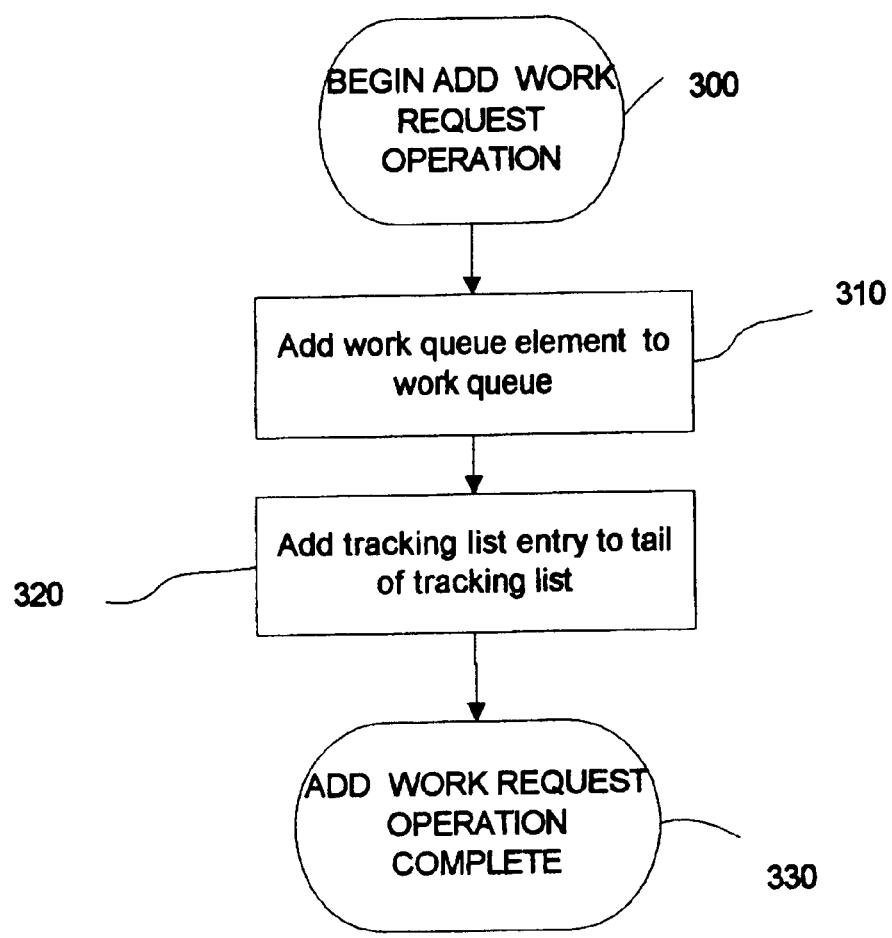
FIG. 3 shows a flow diagram for adding a work request to a work queue according to an embodiment of the present invention.

In a specific embodiment of the present invention, as shown in FIG. 3, a client process in an Infiniband™ network submits 300 a work request for a network operation, such as moving data from the host 103 memory to another network node. Each work request is assigned a unique 64-bit work request identifier that the client passes to processing hardware, called a host channel adapter ("HCA") 112. (Refer to FIGS. 1 and 2). This causes an instruction called a work queue element ("WQE") 205 to be placed 310 on a work queue 210, 214. The HCA executes the WQEs on a particular work queue 210, 214 in the order the WQEs were placed on the work queue. When the HCA finishes processing a WQE, a completion queue element ("CQE") 222 may be placed on a completion queue 230. Note that WQEs may be either "signaled" or "unsignaled." A CQE will always be added to the assigned completion queue when a signaled WQE completes, whether the WQE completes correctly or in error. For unsignaled work requests, a CQE is added to the completion queue only if the WQE completes with an error.

In this embodiment, each CQE 222 specifies all the information necessary for a work completion, as required by the Infiniband specification, and either contains that information directly or points to other structures, for example, the associated WQE 205 that contains the information. For example, many hardware implementations choose to put either a pointer address or a work queue index number in the completed CQE. This link to the associated WQE will be called a "resource identifier." Further, while a work queue 210, 214 is associated with one completion queue 220, one completion queue may contain CQEs 222 from a plurality of work queues. Each CQE 222 identifies the work queue that contained the associated work request.

Figure 4:
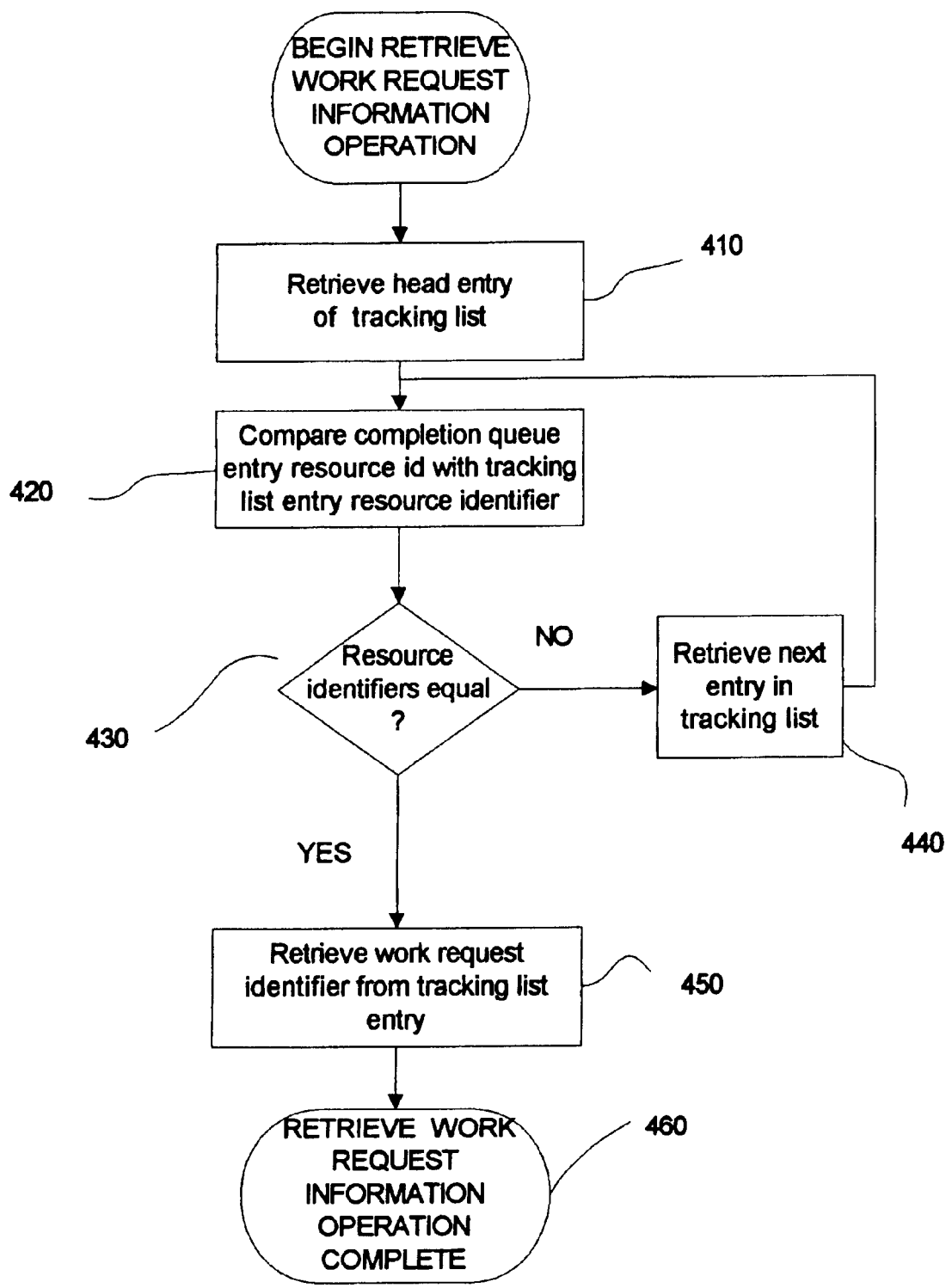
FIG. 4 shows a flow diagram for searching a tracking list for an entry corresponding to a work request, according to an embodiment of the present invention.

In this embodiment, when a WQE 205 is added to a work queue 210, 214 an entry is added 320 to the tail of the tracking list 212, 216 for that work queue. This tracking list entry contains at least the work request identifier and the resource identifier corresponding to that WQE 330. When a CQE is processed the work queue 210, 214 is identified from the CQE and the tracking list 212, 216 for that work queue is searched from its head. As shown in FIG. 4, the tracking list is searched 410 using the resource identifier from the CQE as the search key 420. When a match is found (430 and 440), the work request identifier is retrieved 450 from the tracking list entry. Thus, with the information in the completion queue entry and in the tracking list, it is always possible to correctly and uniquely identify 260 the work request identifier for the WQE that generated the CQE. This holds both for successful operations and for those operations completed with errors, independent of the number of times a given work queue has been created, used, destroyed, and reactivated because the HCA always executes the WQEs on a particular work queue 210, 214 in the order the WQEs were placed on the work queue. Additionally, since the WQEs on a given work queue are completed in order, a given resource identifier may be reused for a later work request since the later work request must complete after the earlier request—there is no possibility of confusion.

A tracking list may be destroyed when the corresponding CQ has been destroyed. Further, a tracking list that corresponds to a work queue that has been destroyed or reset may be marked for destruction when the corresponding CQ becomes empty. At that point there is no longer a possibility that work requests corresponding to tracking list entries will generate completions. Thus, a list of tracking lists that correspond to work queues that have been destroyed or reset may be maintained. Whenever a CQ is polled and found to be empty, this list may be searched and any tracking lists found that correspond to the empty CQ may be destroyed.

In a further specific embodiment of the invention according to the preceding embodiment, the tracking list entry 220 also includes a signaled/unsignaled flag. This flag indicates whether the WQE is signaled or unsignaled. Since WQEs are processed in the order in which they are added to a particular work queue, if the CQE indicates a signaled work request, the tracking list entry closest to the head of the list with the signaled flag set must correspond to that CQE. Thus, the client may be able to minimize processing by searching for the signaled flag in the tracking list entry rather than searching for a match on resource identifier 420 and 430, during the process shown in FIG. 4, if the CQE indicates a signaled work request. Further, completions for tracking list entries before the entry for the signaled work request may also be processed as these entries must correspond to unsignaled work requests that have completed successfully, since WQEs are executed in order.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic or use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The described embodiments of the invention are intended to be exemplary and numerous variations and modifications will be apparent to those skilled in the art. All such variations and modifications are intended to be within the scope of the present invention as defined in the appended claims.

What is claimed is:

1. A method for linking a given work request from a given work queue with an entry in a completion queue, the completion queue entry including a work queue identifier corresponding to the given work queue and a resource identifier corresponding to the given work request, the method comprising:

providing a work request tracking list for the given work queue; and appending an entry to the tracking list for the given work queue when the given work request is added to the given work queue, the tracking list entry including the resource identifier corresponding to the given work request and a work request identifier uniquely assigned to the given work request.

2. A method according to claim 1 further comprising:

processing the completion queue entry including:

selecting the tracking list for the given work queue;

searching the tracking list to locate the tracking list entry containing a resource identifier matching the resource identifier of the completion queue entry; and retrieving the work request identifier from the located tracking list entry.

3. A method according to claim 1, wherein the resource identifier is a pointer address.

4. A method according to claim 1, wherein the resource identifier is a work queue index.

5. A method according to claim 1, wherein appending an entry to the tracking list further includes setting a signaled flag in the tracking list entry when the given work request will generate a completion queue entry when the given work request completes successfully.

6. A method according to claim 5, further comprising:
processing the completion queue entry when the given work queue is unavailable including:
selecting the tracking list for the given work queue;
searching the tracking list for the given work queue to locate the entry closest to the head of the tracking list with the signaled flag set, when the completion queue entry corresponds to a work request that completed successfully; and
retrieving the work request identifier from the located tracking list entry.

7. A method for retrieving information about a work request in a work queue when the work queue is unavailable using a completion queue entry from a completion queue, the work request linked with a work request identifier and a resource identifier, the completion queue entry including a work queue identifier corresponding to the work queue and the resource identifier, the method comprising:
selecting a tracking list for the work queue using the work queue identifier, the tracking list including a given entry that includes the resource identifier and the work request identifier for the work request;
searching the tracking list for the given entry by locating the resource identifier; and
retrieving the work request identifier from the given entry for retrieving information about the given work request using the work request identifier.

8. A method according to claim 7, wherein the resource identifier is a pointer address.

9. A method according to claim 7, wherein the resource identifier is a work queue index.

10. A device for use in a computer system, the device comprising:
a work queue including a work request, the work request linked with a work request identifier and a resource identifier;
a completion queue, the completion queue including an entry, the completion queue entry including a specified work queue identifier and a specified resource identifier; and
a work request tracking list for the work queue, the tracking list including an entry corresponding to the work request, the tracking list entry including the resource identifier and the work request identifier, the device for linking the work request with the completion queue entry when the specified work queue identifier identifies the work queue and the specified resource identifier matches the resource identifier.

11. A device according to claim 10, wherein the resource identifier is a pointer address.

12. A device according to claim 10, wherein the resource identifier is a work queue index.

13. A computer program product for use in a computer system for linking a given work request from a given work queue with an entry in a completion queue, the completion queue entry including a work queue identifier corresponding to the given work queue and a resource identifier corresponding to the given work request, the computer program product comprising a computer usable medium having computer readable program code thereon, the computer readable program code, including program code for:
providing a work request tracking list for the given work queue; and
appending an entry to the tracking list for the given work queue when the given work request is added to the given work queue, the tracking list entry including the resource identifier corresponding to the given work request and a work request identifier uniquely assigned to the given work request.

14. A computer program product according to claim 13, the product further including program code for:
processing the completion queue entry when the given work queue is unavailable including:
selecting the tracking list for the given work queue;
searching the tracking list to locate the tracking list entry containing a resource identifier matching the resource identifier of the completion queue entry; and
retrieving the work request identifier from the located tracking list entry.

\* \* \* \* \*